United States Patent [19]

Chenoweth

[11] E Re. 28,641

[45] Reissued Dec. 9, 1975

[54] RETRIEVABLE SUBSURFACE WELL TOOLS

[75] Inventor: David V. Chenoweth, Maui, Hawaii

[73] Assignee: Baker Oil Tools, Inc., Los Angeles, Calif.

[22] Filed: Aug. 7, 1974

[21] Appl. No.: 495,545

Related U.S. Patent Documents

Reissue of:

[64] Patent No.: 3,361,207
Issued: Jan. 2, 1968
Appl. No.: 394,402
Filed: Sept. 4, 1964

[52] U.S. Cl. ..... 166/120; 166/139; 166/182; 166/187; 166/237

[51] Int. Cl.[2] ..... E21B 23/00; E21B 33/12

[58] Field of Search ..... 166/138–140, 166/120, 122, 134, 182, 216, 217, 187, 212, 237, 48, 214, 119, 239; 175/267–269

[56] References Cited

UNITED STATES PATENTS

| | | | |
|---|---|---|---|
| 2,230,447 | 2/1941 | Bassinger | 166/237 |
| 2,389,985 | 11/1945 | Justice et al. | 166/237 |
| 2,675,875 | 4/1954 | Potts | 166/226 |
| 2,806,535 | 9/1957 | Bender et al. | 166/134 |
| 2,893,492 | 7/1959 | Brown | 166/119 |
| 2,906,346 | 9/1959 | Johnston | 166/214 |
| 2,982,358 | 5/1961 | Brown | 166/120 |
| 3,020,959 | 2/1962 | Nutter | 166/131 |
| 3,094,169 | 6/1963 | Conrad | 166/134 |
| 3,195,642 | 7/1965 | Conrad | 166/120 |

*Primary Examiner*—James A. Leppink
*Attorney, Agent, or Firm*—Bernard Kriegel

[57] ABSTRACT

*A retrievable well tool having a body structure on which a downwardly tapering expander is disposed which can expand companion normally retracted slips against the well casing, a pressure differential from above or below the tool tending to hold the expander in downward wedging relation to the slips to retain them in anchored condition against the casing, relieving of the pressure differential and elevation of the expander effecting release and retraction of the slips from the well casing.*

27 Claims, 18 Drawing Figures

RETRIEVABLE SUBSURFACE WELL TOOLS

Matter enclosed in heavy brackets [ ] appears in the original patent but forms no part of this reissue specification; matter printed in italics indicates the additions made by reissue.

The present invention relates to subsurface well bore apparatus, and more particularly to tools, such as anchors, well packers and bridge plugs, adapted to be set in well bores.

An object of the invention is to provide an improved retrievabe subsurface well bore apparatus, such as a well packer (including a well packer capable of functioning as a bridge plug), having a normally retracted packing structure to facilitate lowering and elevating of the apparatus in the well bore, the apparatus being capable of being set in the well bore and of holding pressure in both longitudinal directions without the assistance of a tubing string or other force applying device.

Another object of the invention is to provide a retrievable subsurface well bore apparatus capable of being anchored in the well bore against movement in both longitudinal directions, and in which it is unnecessary for any parts to move in connection with change in the direction in which the apparatus is to be anchored to withstand fluid pressures acting thereagainst.

A further object of the invention is to provide retrievable subsurface well bore apparatus capable of being anchored in a well bore against movement in both longitudinal directions and of being locked mechanically in its anchored position to prevent subsequent relative movement of the anchoring parts until their retraction is desired for the purpose of releasing the well apparatus from the well bore.

An additional object of the invention is to provide improved retrievable subsurface apparatus capable of being anchored in a well casing against movement in both longitudinal directions in which the apparatus can be easily released from the well casing whenever desired. In a more limited sense, the apparatus includes a reverse or downwardly tapering expander and companion slips in which pressure differential from above the apparatus, as well as from below the apparatus, tend to hold the expander in downward wedging relation to the slips, so that bleeding off of the pressure differential and elevation of the expander effects an easy release and retraction of the slips from the well casing.

Yet another object of the invention is to provide an improved well packer embodying a packing structure adapted to seal against a well casing, in which the well packer embodies a mechanism for retaining a setting or pack-off force on the apparatus despite loss of packing material around the apparatus due to its extrusion or cold flowing, and the like.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

FIGS. 1a, 1b, 1c and 1d together constitute a com bined side elevational view and longitudinal sectio through a well apparatus embodying the invention di posed in the well casing with the parts in their relativ positions for lowering the apparatus in the well casin;

FIGS. 1b, 1c and 1d constituting lower continuatior of FIGS. 1a, 1b and 1c, respectively;

FIGS. 2a, 2b, 2c and 2d are longitudinal sections co responding to FIGS. 1a to 1d disclosing the well packe anchored in packed-off condition within the well ca ing, FIGS. 2b, 2c and 2d constituting lower continu tions of FIGS. 2a, 2b and 2c, respectively;

FIGS. 3a and 3b together constitute a longitudin section through the upper portion of the apparatus i lustrated in FIGS. 2a and 2b disclosing the release the running-in and retrieving tool from the well packe or bridge plug therebelow, FIG. 3b being a lower co tinuation of FIG. 3a;

Figure 1A:
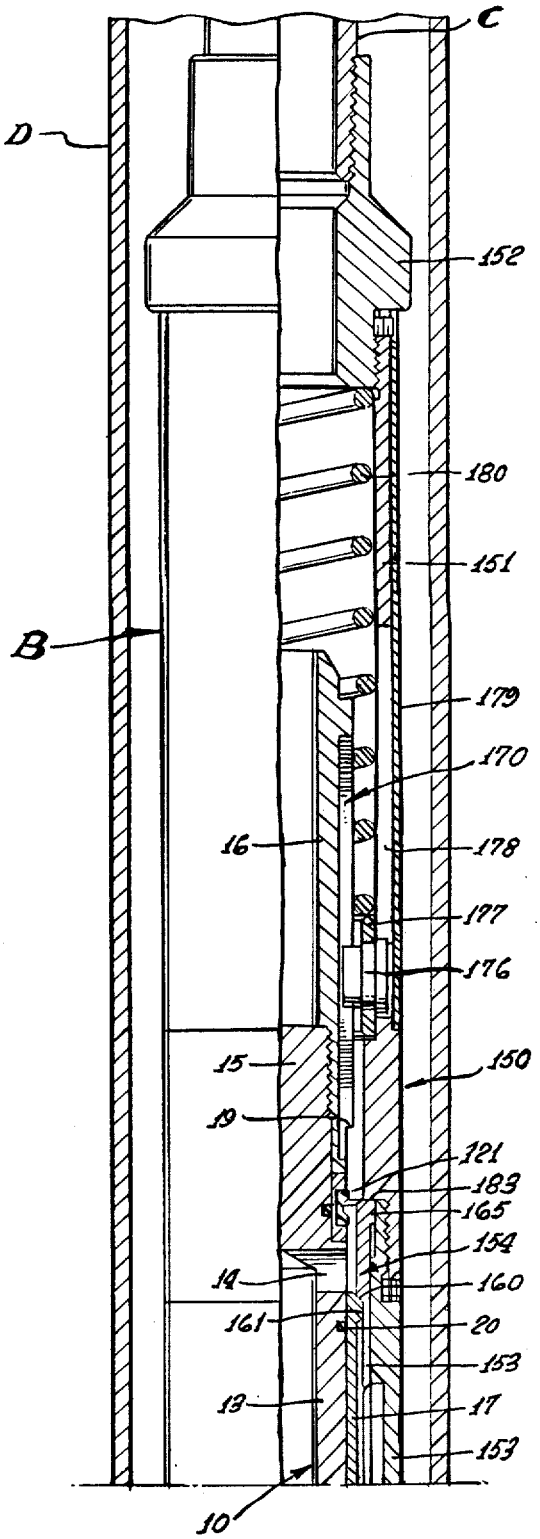

The invention is illustrated in the drawings as beir embodied in a well packer A, such as a bridge plu adapted to be connected to a running-in and retrievir tool B, which is, in turn, attached to a tubular string C by means of which the combination of apparatus is lov ered in a well casing D to a desired setting point. Th running-in and retrieving tool B is also used in conne tion with release of the well packer from the well casir and its shifting to another location therein, or its con plete removal through the casing to the top of the we bore.

The specific well packer A illustrated includes a ma drel or body 10 having a longitudinal passage 1 therein open at its lower end. The mandrel includes a elongate lower section 12, the upper end of which threadedly secured to an upper section 13 having sic ports 14 therethrough establishing communication b tween the central passage and the exterior of the ma drel or body 10. The upper pin end 15 of the upp body section is threadedly secured to a control hea 16, there being a sleeve valve 17 slidable longitudinal along the upper body mandrel section 13 from a low position, in which the ports 14 are opened, to an upp position across the ports. The lower position is dete mined by engagement of the lower end of the slee valve 17 with an upwardly facing body shoulder 18, i upper position being determined by engagement of i upper end with a downwardly facing shoulder 19 on t control head. When in its upper position closing t ports 14, leakage of fluid between the sleeve valve a the mandrel or body 10 is prevented by opposed s embers 20, 21 mounted on the body section 13 which dably and sealingly engage the inner surface of the eve valve 17.

An upper packing structure 22 surrounds the body, ich is adapted to seal against the wall of the well cas- g D. As specifically disclosed, a plurality of packing eves 23, 24, 25 of pliant, elastic material, such as bber or rubber-like material, encompasses an elon- te sleeve 26 surrounding the body 10, the upper end the uppermost packing sleeve or element 23 engag- g an upper abutment 27 threadedly secured to the eve 26, there being a gage ring 28 threaded on the per abutment in engagement with the upper packing ement 23 to minimize the extent of extrusion of the bber packing material through the annular clearance ace between the gage ring 28 and the wall of the well sing D. The upper packing element 23 contacts a acer ring 29 which, in turn, is engaged by the upper d of the intermediate packing element 24 that en- ges a lower spacer ring 30, the latter contacting the per end of the lower packing element 25 which en- ges a lower abutment 31 having a lower gage ring 32 readedly secured thereto. The lower gage ring will o tend to minimize the extent of extrusion or cold wing of the lower packing sleeve 25 through the an- lar clearance space between the gage ring and the ll of the well casing D, as a result of shortening and mpression of the lower packing sleeve and its expan- n against the wall of the well casing, as described reinbelow.

Figure 1B:
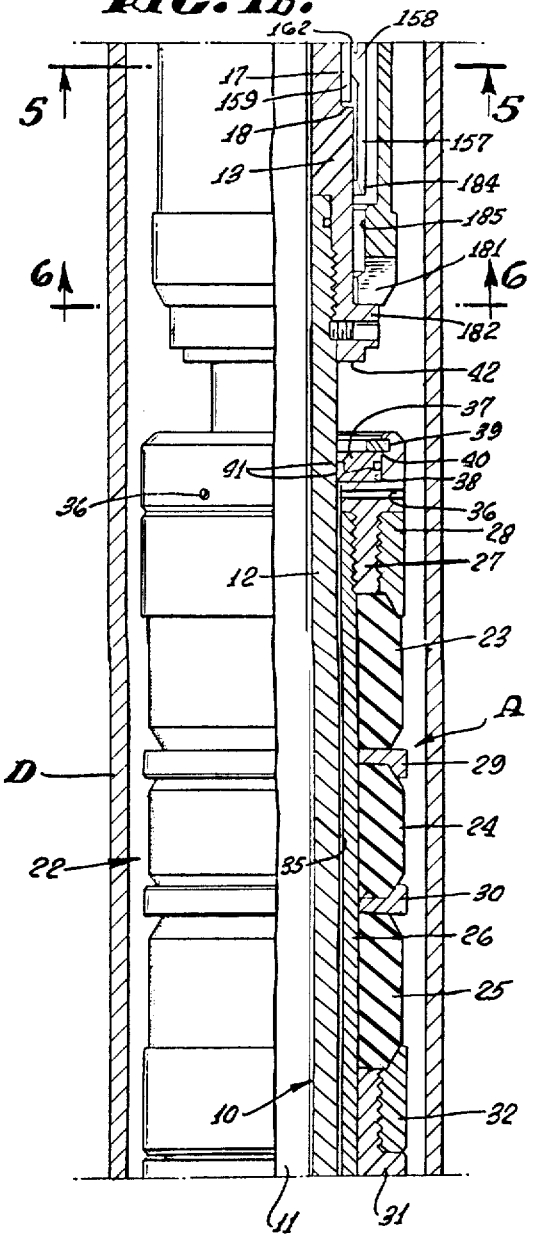
Figure 1C:
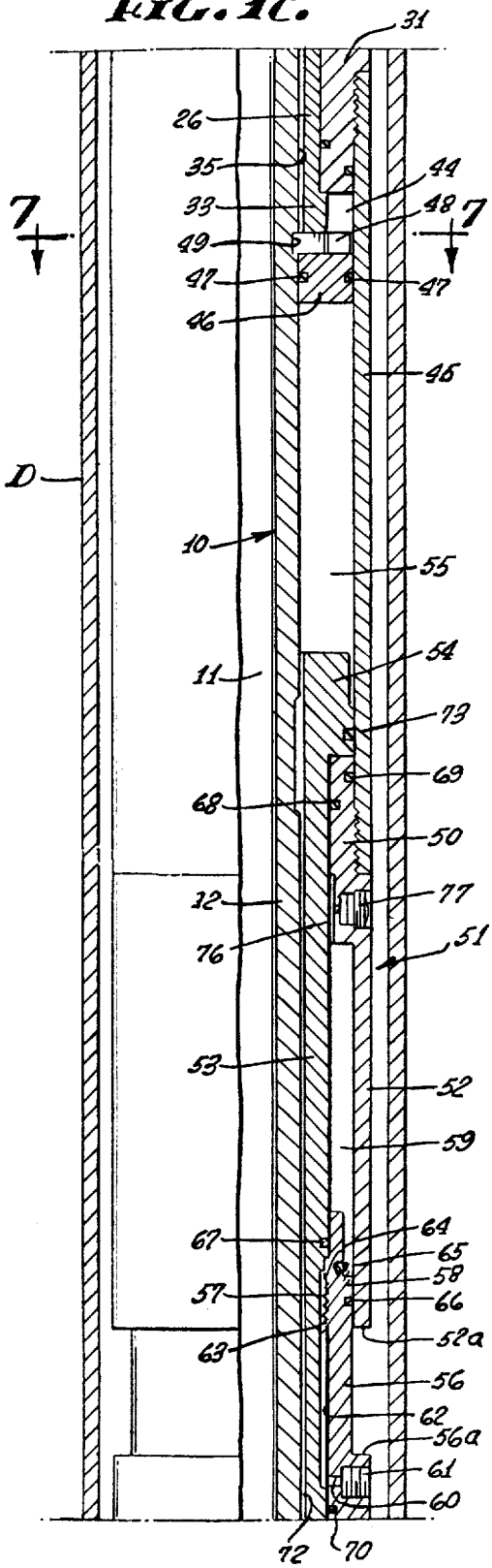
Figure 1D:
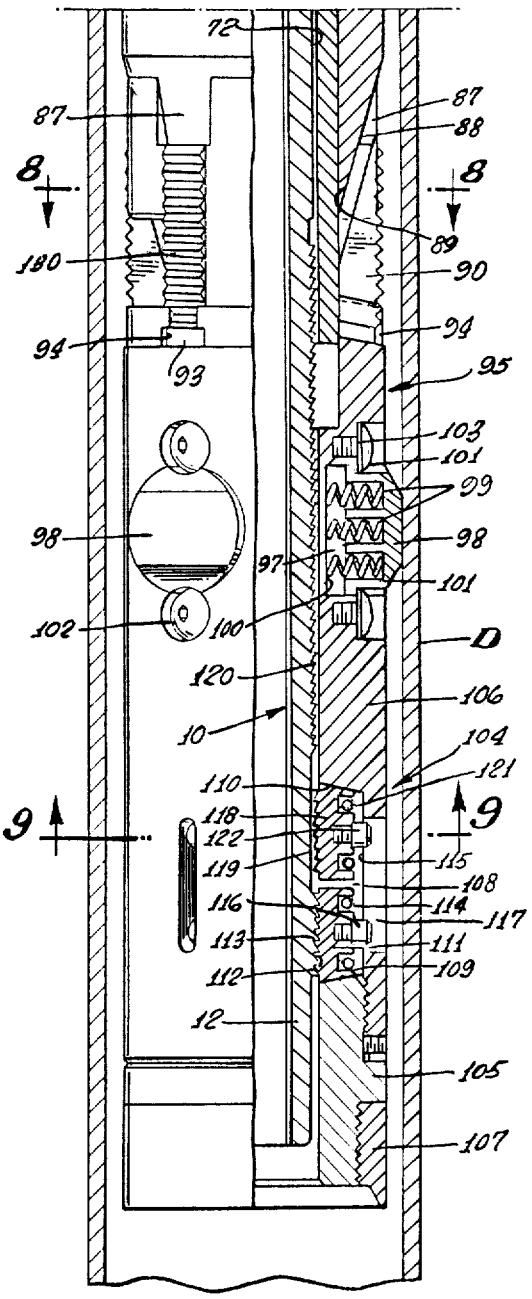

The lower end of the packing structure sleeve 26 has external flange 33 adapted to engage the lower end the lower abutment 31, which will limit the extent of parating movement between the upper and lower utments 27, 31, as shown in FIGS. 1b and 1c, in ich the packing elements 23, 24, 25 are retracted. owever, the upper abutment 27 can move toward the wer abutment 31 for the purpose of exerting an axial rce on the packing elements to effect their shortening d lateral outward expansion and compression against e wall of the well casing D, and also against the pe- hery of the packing structure sleeve 26.

The packing structure sleeve 26 is spaced laterally m the periphery of the mandrel or body 10, provid- g an annular passage or space 36 therebetween rough which fluid under pressure can pass, the upper d of this passage communicating with upper ports 36 tending through the upper abutment 27 to its exte- r. The upper end of the passage 35 is closed by a aring ring 37 disposed within a counterbore 38 in the per abutment and held therein by a split snap retain- g ring 39 located in a groove 40 in the upper abut- ent and overlying the bearing ring. The bearing ring s inner and outer seals 41 sealing against the periph- y of the lower body section 12 and also against the ll of the counterbore 38 to prevent passage of fluid erebetween. This bearing ring is adapted to be en- ged by a lower pilot portion 42 on the upper body ction 13 when the apparatus is to be set, to facilitate tation of the body 10 relative to the packing structure and the remainder of the apparatus surrounding the ain body or mandrel of the tool, in the manner de- ribed hereinbelow.

The lower end of the annular fluid passage 35 opens to a pressure chamber 44 below the lower abutment . This pressure chamber is defined by the lower abut- ent 31, an upper cylinder sleeve 45 threadedly at- ched thereto and depending therefrom in lateral spaced relation to the body 10 of the tool, and an annu- lar piston 46 which is slidable longitudinally along both the periphery of the body and the inner wall of the upper cylinder sleeve. This piston has inner and outer seal rings 47 sealingly engaging the periphery of the body and the inner wall of the cylinder sleeve, respec- tively. Its upward movement relative to the body 10 is limited by its engagement with a two-piece stop ring 48 disposed in a peripheral groove 49 in the body and ex- tending substantially to the wall of the cylinder sleeve 45. This stop ring is also engageable with the lower end of the packing structure sleeve 26 when the apparatus is to be retracted or released from the well casing, fol- lowing its setting thereagainst.

Figure 11:
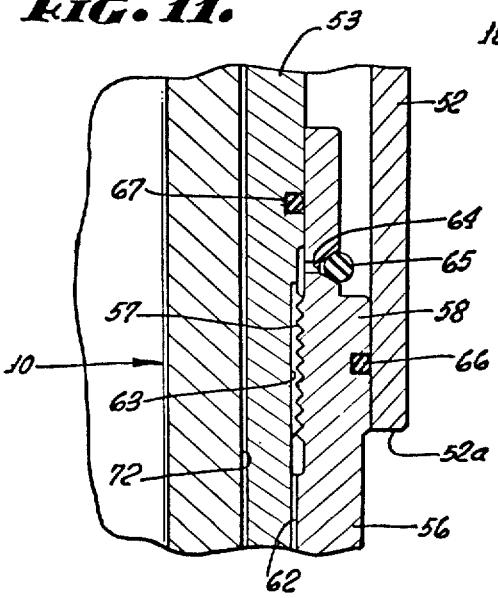
FIG. 11 is a fragmentary enlarged longitudinal se tion through the gas pressure inlet portion of the app ratus.

The lower portion of the upper cylinder sleeve 45 is threadedly secured to the upper cylinder head 50 of a cylinder 51 having a cylinder sleeve 52 depending therefrom. The upper cylinder sleeve 45, head 50, and lower cylinder sleeve 52 encompass a connector sleeve 53, the upper head 54 of which is disposed in an annu- lar chamber 55 defined between the upper cylinder sleeve 45 and body 10 of the tool, and which head 54 is also disposed between the cylinder head 50 and the annular piston 46. The connector sleeve 53 extends within a reverse cone or expander 56 to which it is suit- ably secured, as by means of a threaded connection 57, the upper portion of the reverse cone or expander being constituted as an annular piston 58 disposed within and adapted to slide relatively along the wall of the lower cylinder sleeve 52. The spaced relation be- tween the lower cylinder sleeve 52 and the connector sleeve 53 provides an annular chamber 59 adapted to contain a gas under pressure, such as compressed air or nitrogen. This gas can be introduced into the chamber through an inlet port 60 closed by a filler plug 61 threadedly secured within the expander member 56. The gas can pass from the inlet port 60 through an an- nular passage 62 between the connector sleeve 53 and the expander 56, and through a longitudinal slot 63 cut through the externally threaded portion of the connec- tor sleeve (FIG. 11) to an inlet port 64 extending through the expander member above its piston 58. A one-way or check valve surrounds the port, being dis- closed in the form of an elastic O-ring 65 embracing the exterior of the expander above the piston 58 and clos- ing inwardly to prevent gas from having retrograde movement through the inlet port 64. However, it per- mits gas under pressure to flow through the inlet port 64 into the chamber 59.

Leakage of gas from the chamber 59 is prevented by a suitable side seal ring 66 on the piston sealingly en- gaging the wall of the lower cylinder sleeve 52, by a seal ring 67 carried by the connector sleeve 53 and engag- ing the upper portion of the expander 56, and by an inner seal ring 68 on the cylinder head 50 slidably and sealingly engaging the periphery of the connector sleeve 53. A thread seal ring 69 is also mounted on the cylinder head 50, engaging the upper cylinder sleeve 45 to prevent fluid leakage through the threaded connec- tion between the head and upper cylinder sleeve. Leak- age of fluid from the injection or inlet port 60 in a downward direction between the connector sleeve and expander is prevented by a suitable seal ring 70 mounted on the expander 56 and engaging the periph- ery of the connector sleeve 53 below its inlet port.

The connector sleeve 53 is relatively slidable with re- spect to the cylinder 51 and is laterally spaced from the mandrel or body 10 to provide an annular passage 72 therebetween which will allow fluid pressure from below the apparatus to pass through such annular passage into the chamber 55 above the connector head 54. Such fluid under pressure cannot escape upwardly out of the chamber because of the annular piston 46, and it cannot escape downwardly between the upper cylinder sleeve and the connector head because of the provision of a suitable seal ring 73 on the connector head which slidably and sealingly engages the wall of the upper cylinder sleeve 45. The connector head 54 and the cylinder head 50 are disclosed in FIG. 1c as being in engagement with one another. However, when the tool is set, the cylinder head moves downwardly away from the connector head, as disclosed in FIG. 2c, the annular chamber or space 74 between the two heads always containing air at a pressure no greater than atmospheric, and actually much less than atmospheric, since air is trapped between the head 50, 54 when the tool is assembled at the top of the well bore. The increase in volume of the chamber 74 as the cylinder head 50 moves downwardly away from the connector head 54 will result in the air expanding and having a lesser pressure than atmospheric.

Figure 10:
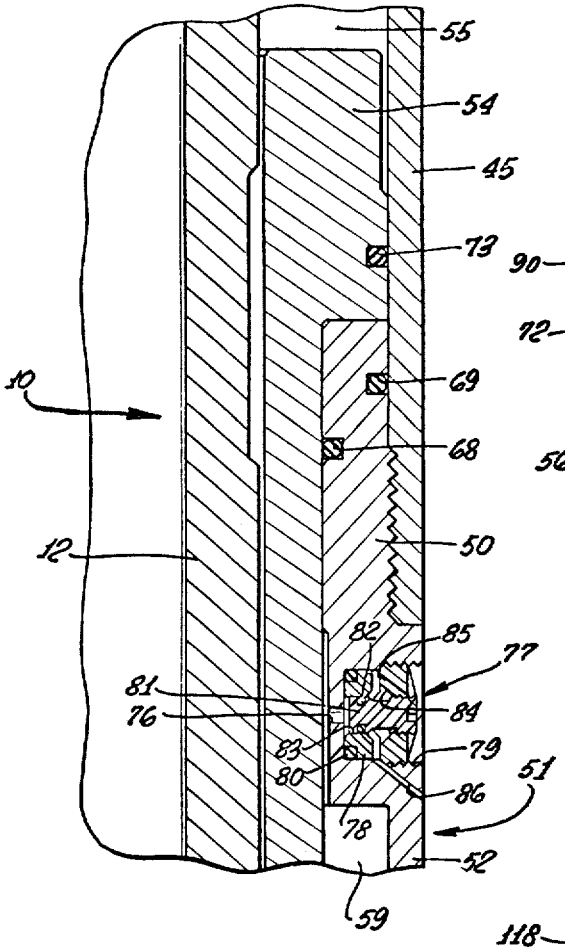
FIG. 10 is an enlarged fragmentary longitudinal sec tion through the gas pressure bleeder portion of the a paratus.

A suitable gas at a desired pressure is ejected into the compressed air or other gas chamber 59 through the inlet port 60 and through the check valve controlled port 64 in the upper portion of the expander 56. Such gas under pressure remains trapped in the chamber, but may be bled therefrom when desired in the event the tool is to be dismantled at the top of the well bore. Thus, a bleeder port 76 is provided in the cylinder head that communicates with the upper end of the chamber 59 which is normally closed by a bleeder plug 77 threaded into the cylinder head 50. Such bleeder plug can assume any desired form, the one disclosed more specifically in FIG. 10 being a safety device to prevent the pressure in the chamber from blowing the plug outwardly after it has been unthreaded from the head. As shown in FIG. 10, the bleeder plug includes an outer member 78 threaded into a radial bore 79 in the cylinder head and having a suitable side seal ring 80 sealing against the wall of the bore. An inner plug 81 is threaded within the outer plug and carries a suitable seal ring 82 sealing against the wall of the inner plug passage 83. As disclosed in FIG. 10, the entire plug construction 77 is in a position closing the bleeder port 76. When the gas under pressure is to be vented or bled from the chamber 59 with the tool located at the top of the well bore, the inner bleeder plug member 81 is first threaded outwardly, its inner head engaging a companion shoulder 84 on the outer threaded plug member 78, with the head disposed outwardly of lateral bleeder ports 85 in the outer member to allow the compressed gas to flow through the bleeder port 76 and through the radial ports 85 into a passage 86 leading to the atmosphere. The inner plug 81 can be rotated and threaded inwardly again to close the bleeder port 76, i.e., being replaced in the position illustrated in FIG. 10.

Figure 8:
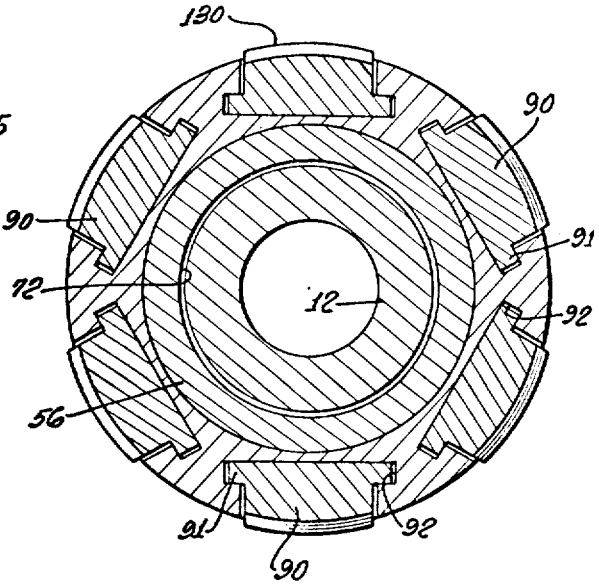
FIG. 8 is a cross-section on an enlarged scale take along line 8—8 on FIG. 1d.
Figure 9:
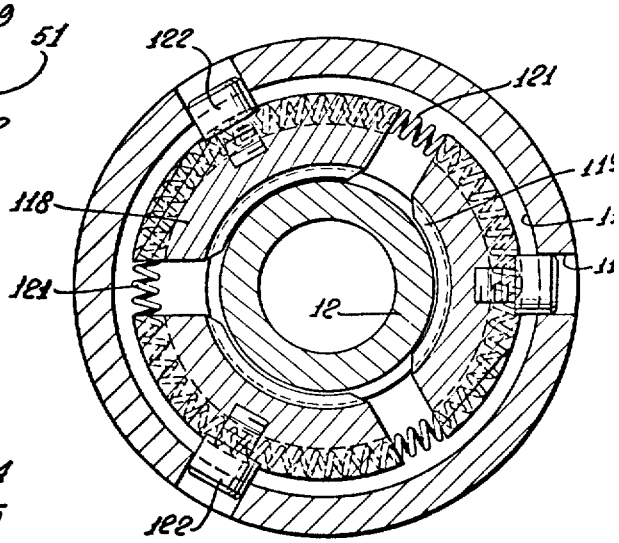
FIG. 9 is a cross-section on an enlarged scale take along the line 9—9 on FIG. 1d.

The expander 56 has a plurality of longitudinal slots 87, the base 88 of each slot tapering in a downward and inward direction and being engageable with a companion tapered inner surface 89 on a slip 90 received within the slot. Each slip has opposed inclined side tongues 91 slidable within companion side grooves 92 in the expander (FIG. 8), the tongues and grooves being parallel to the tapered surfaces 88, 89 of the expander and slip. The slips 90 are mounted for joint longitudinal movement, but are capable of partaking of generally radial inward and outward movement, b providing lower inverted T-heads 93 on each of then which are receivable within companion T-shaped slot 94 in the upper end of a combined slip, drag block, an control unit housing 95. The lower end of the connec tor sleeve 53 is capable of downward movement withi an upper counterbore 96 within such housing. Th housing 95 has a plurality of circumferentially space generally radial cavities 97 therein, each receiving drag block 98 which is urged outwardly into frictiona engagement with the wall of the well casing D by a plu rality of helical compression springs 99 engaging th housing portion forming the base 100 of the cavity an also engaging the drag block itself. The radial outwar movement of each drag block is limited by engagemen of upper and lower shoulders 101 thereon with th heads 102 of upper and lower stop screws 103 thread edly secured to the housing on opposite sides of th cavity and overlying the shoulders.

The lower portion of the housing 95 forms part of control unit 104 that determines the retention of th packer parts in retracted position, their release to allow the packer to be anchored in packed off condition i the well casing, the retention of the packer or bridge plug in its packed-off and anchored condition, and it release from such condition in the well casing and relo cation of its parts in their initial condition. Such hous ing includes a lower housing section 105 threadedly se cured to the lower portion of the main housing sectior 106 thereabove, there being a suitable gage ring 107 threaded on the lower end of the lower housing sectior for insuring that the entire tool can be moved down wardly in the well casing D to the desired setting point and to prevent any portions of the apparatus from becoming stuck in the well casing.

The housing sections together provide a circumferential internal groove 108, the lower side 109 of the groove tapering to a slight extent in a downward and inward direction, the upper side 110 of the groove tapering upwardly to a slight extent and in an inward direction. Disposed within the groove are upper and lower clutch or lock structures. The lower lock structure includes a plurality of clutch segments or elements 111 having internal ratchet teeth 112 constituted by right-hand buttress threads adapted to mesh with companion right-hand buttress or ratchet threads 113 on the lower portion of the body or mandrel 10. The segments 111 are urged in an inward direction, to hold the buttress threads 112 meshing with the body threads 113, by a plurality of encircling helical tension springs 114. The segments can move radially outward so that their teeth 112 are free from engagement with the lower buttress threads 113 on the body, since there is adequate lateral clearance between the outer surfaces of the clutch segments and the outer base portion 115 of the groove 108 in which they are located. Rotation of the segments 111 is prevented by a guide screw 116 threadedly secured to each of them and slidably received within a longitudinally extending slot 117 in the housing 95. The buttress threads 112, 113 face in the direction shown in the drawings so that the mandrel or body 10 can ratchet upwardly through the segments 111, but cannot be moved downwardly, except as a result of rotating the body 10 relative to the segments, rotation of the segments being prevented or resisted by the frictional engagement of the drag blocks 98 against the wall of the well casing D. The right-hand buttress thread connection 112, 113 is preferably a multiple ch thread so that only a comparatively small number turns of the body 10 within the segments is required effect full downward unthreading of the body from : segments, whereupon the body 10 is free to con- ue its downward movement without rotation.

:he control unit 104 of the mechanism also includes per clutch segments or elements 118 having down- rdly facing ratchet teeth 119 in the form of multiple ch buttress threads which are preferably left-hand eads, and which are adapted to engage companion ttress lefthand threads 120 extending longitudinally ng the body 10 thereabove. Encompassing helical ings 121 engage the segments 118 and urge them in- rdly, the segments being adapted to be shifted radi- y outwardly upon downward movement of the body and the left-hand buttress threads 120 therealong. ce the left-hand buttress threads 120 are engaged h the internal threads 119, the body 10 cannot move wardly relative to the segments unless the body is ro- ed in a right-hand direction. Such rotation will not ect rotation of the segments 118 since the latter are vented from turning by guide screws 122 attached the segments and received within the longitudinal ts 117, the guide screws allowing radial inward and tward shifting of the segments, but preventing their ation in view of the resistance to rotation afforded the drag blocks 98.

The left-hand threads 119, 120 are also preferably ltiple pitch threads, so that upon rotation of the dy 10 a lesser number of body turns is required to ef- t upward unthreading of the body from the upper set clutch segments 118, as described hereinbelow.

The apparatus is adapted to be anchored in the well sing against movement in both directions, despite the t that only a single set of slips 90 and a single reverse ne or expander 56 is provided. To facilitate anchor- of the slips in the casing against longitudinal move- nt in both directions, their external wickers or teeth 0 are formed in a neutral position, that is, they face ither upwardly nor downwardly, but will be embed- d in the casing D to resist movement longitudinally realong as the result of being subjected to pressure d other forces from below the tool, as well as pres- re and other forces from above the tool.

In the use and operation of the packer portion of the paratus so far described, its parts are arranged in the lative positions illustrated in FIGS. 1a to 1d, in which e lower right-hand buttress threads 112, 113, are lly meshed, the slips 90 being in their retracted posi- n, as well as the packing structure 22. At this time, e lower end 42 of the upper body section 13 is spaced ove the bearing ring 37. The well packer A is low- ed in the well casing D, as through use of the running- and retrieving tool B, or, if desired, the tubing string uld be connected directly to the packer body 10. The wnward force imposed on the body 10 is transmitted rectly to the housing 95, because of the meshing of e right-hand body threads 113 with the companion reads 112 of the lower clutch segments 111, the seg- ents tending to shift and remain inwardly by virture of e engagement of the lower inclined surfaces of the gments with the companion inclined side 109 of the oove 108 in which they are located. In view of the upling of the body 10 to the housing 95 through the wer set of segments 111, as the body is moved down- ardly, the body 95 is carried with it, the drag blocks sliding along the wall of the well casing. The slips 90 e in their inward position, as disclosed in FIG. 1d, and the downward pull exerted thereon by the housing 95 is transmitted through their tongue and groove interconnections 91, 92 to the expander 56, shifting the latter downwardly and carrying the connector sleeve 53 connected thereto with it. The connector head 54 of the connector sleeve engages the cylinder head 50 to pull the cylinder 51 downwardly with it.

It is to be noted at this time that the lower end 52a of the lower cylinder sleeve 52 is longitudinally spaced from a shoulder 56a on the expander therebelow. The downward movement of the cylinder sleeve 45 is transferred to the lower abutment 31, which engages the flange 33 of the packing structure sleeve 26 to pull such sleeve downwardly and the upper abutment 27 downwardly with it. At this time the upper and lower abutments 27, 31 cannot move relatively toward each other, particularly since the lower end of the packing structure sleeve 26 is engaging the stop ring 48 secured to the body 10.

Prior to lowering of the well packer A in the well casing D, the pressure chamber 59 will have been filled with a suitable gas, such as air, to the desired pressure, which, for example, may be of the order of 1200 p.s.i. Such gas under pressure actually functions as a spring tending to hold the cylinder 51 in an upward position relative to the connector sleeve 53.

It is further to be noted that during lowering of the apparatus in the well casing, the upper segments 118 are disposed between the right and left-hand body threads 113, 120, being in an ineffective position, insofar as clutching action with respect to the body or mandrel is concerned.

When the location in the well casing D is reached at which it is desired to anchor the packer or bridge plug in packed-off condition, the tubing string C is rotated to the right to rotate the body 10 of the tool in the same direction. The drag blocks 98 resist and prevent rotation of the housing 95, so that right-hand rotation of the body causes its right-hand threads 113 to feed downwardly along the lower clutch or lock segments 111, until the right-hand threads 113 completely unthread from the segment threads 112. Such downward unthreading releases the body 10 from the housing 95 and permits the tubing string C to be lowered and correspondingly lower the body, the lower end 42 of the upper mandrel or body section 13 engaging the bearing ring 37, which will then move the packing structure 22 as a unit, and the upper cylinder sleeve 45, downwardly, the downward movement of the latter being transferred through the cylinder head 50 and through the compressed gas in the chamber 59 to the expander 56, the latter shifting downwardly within the slips 90, which are prevented from moving downwardly by virtue of the resistance offered by the drag blocks 98 against the wall of the well casing.

The expander 56 moves down within the slips 90 to expand the latter outwardly into firm engagement with the casing, after which the expander is prevented from moving downwardly to any further extent. A continued straight-line downward movement of the tubing C and mandrel 10 will then effect a shifting of the packing structure 22 and the upper cylinder sleeve 45 downwardly as a unit, the cylinder 51 moving along the connector sleeve 53 until the lower end 52a of the cylinder engages the expander shoulder 56a, the pressure of the gas in the cylinder 59 being increased, in view of the decrease in its volume. The downward thrust of the packing structure 22 and the cylinder sleeves 45, 52 is then transmitted directly from the end 52a of the lower cylinder sleeve to the expander 56 and from the expander through the slips 90 and its wickers 130 to the well casing D.

An increase in downward force imposed on the tubing string C and body 10 then effects a shifting of the upper abutment 27 towards the lower abutment 31, since the expander prevents the latter from moving downwardly any further, the upper abument moving toward the lower abutment to shorten the packing elements 23, 24, 25 and expand them outwardly into anchored engagement with the wall of the well casing (FIGS. 2a to 2d). During downward movement of the body 10, after the right-hand buttress threads 113 have become unthreaded and released from the clutch segments 111, the left-hand threads 120 can ratchet downwardly freely through the upper clutch segments 118. However, the body 10 cannot move upwardly relative to the housing 95 since the coengagement between the external and internal ratchet threads 120, 119 on the body and upper segments prevents such movement. An upward force imposed on the upper segments 118 causes them to be urged inwardly to remain in full mesh with the left-hand threads 120 because of the inclined surface on the upper segments engaging the companion upper side 110 of the housing groove 108. Accordingly, the body 10 of the tool can move downwardly relatively to the housing 95, but it cannot move upwardly, retaining the slips 90 and packing structure 22 in an outward expanded condition.

Figure 2A:
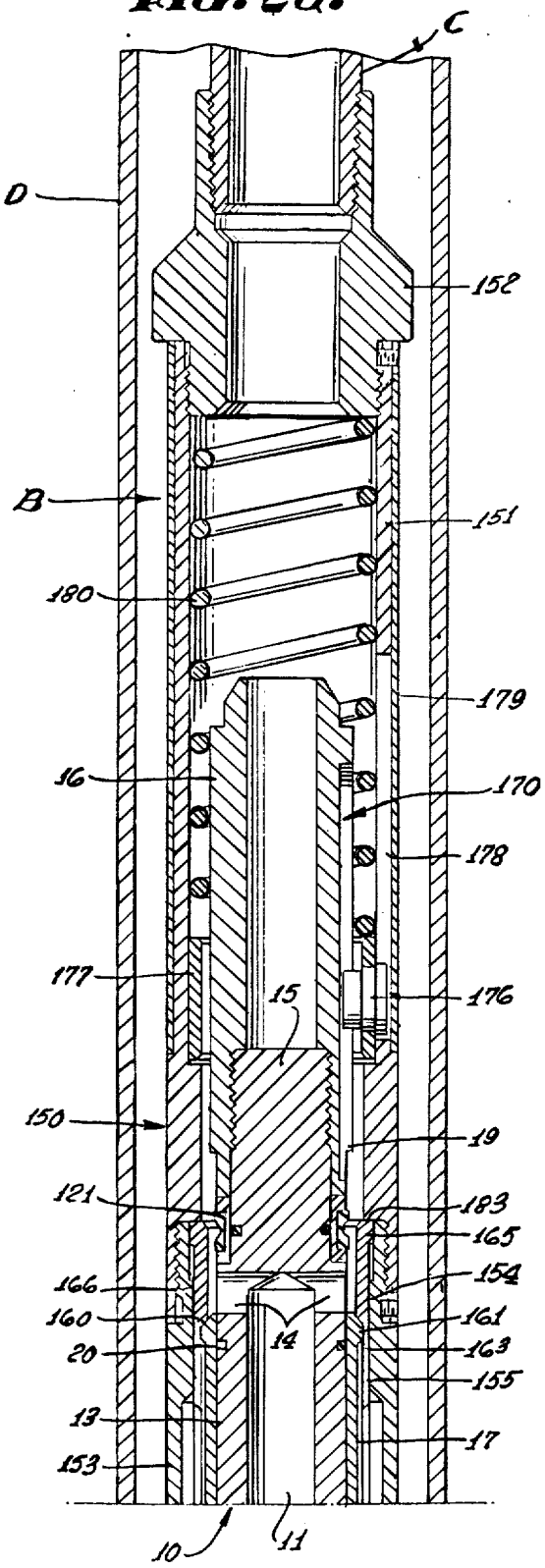
Figure 2B:
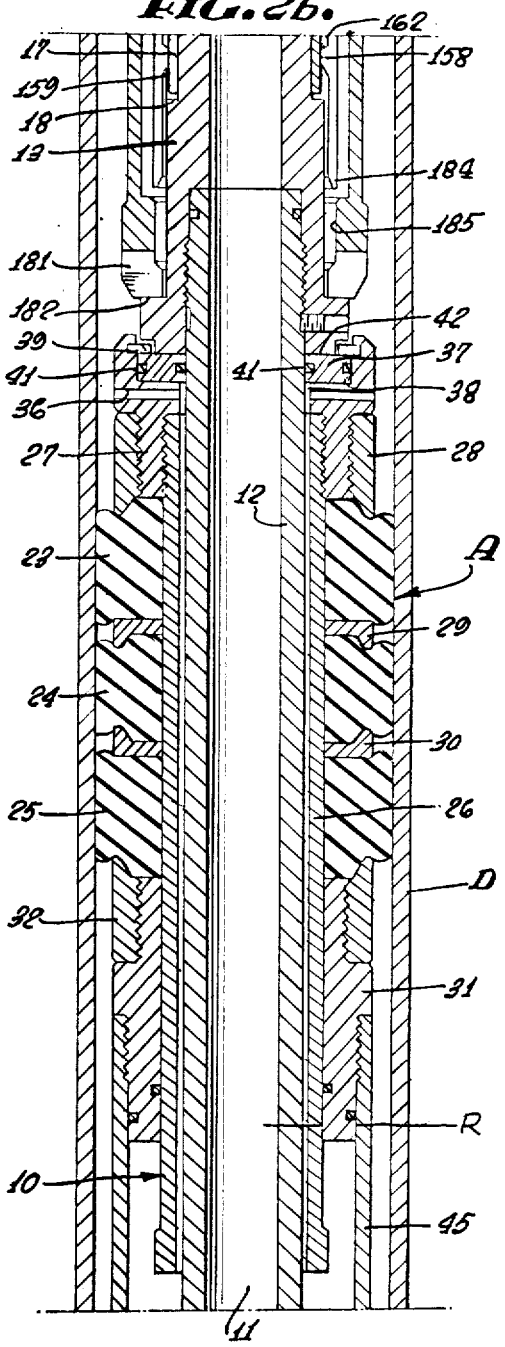
Figure 2C:
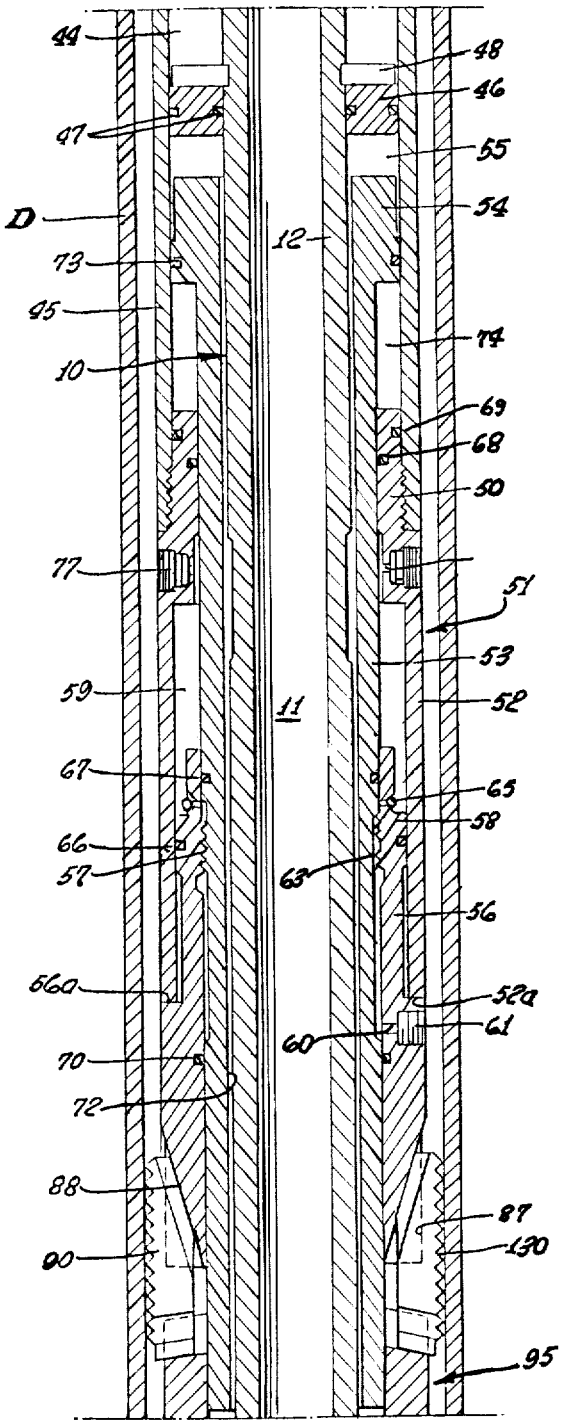
Figure 2D:
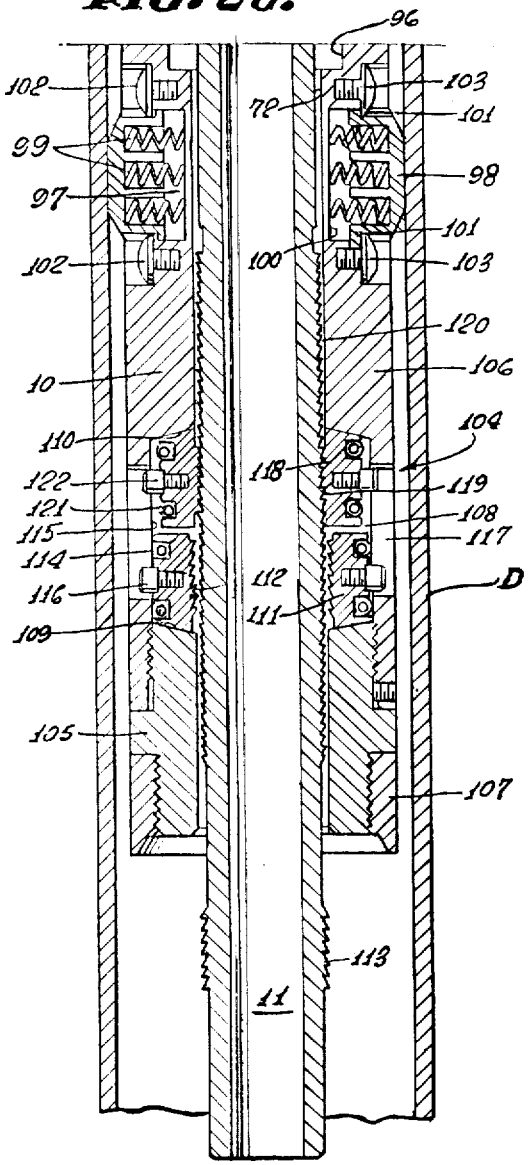

During the downward shifting of the cylinder 51 along the connector sleeve 53, to bring the lower end 52a of the cylinder sleeve 52 into engagement with the shoulder 56a, the cylinder head 50 is moved away from the connector sleeve head 54, as disclosed in FIGS. 2c, the gas under pressure in the chamber 59 constantly tending to urge the cylinder 51 upwardly and the lower abutment 31 toward the upper abutment 27 to retain the packing elements 23, 24, 25 sealed off against the wall of the well casing D, as well as against the packing sleeve 26. Thus, in the event of extrusion of packing material, after the well packer or plug A has been set in the well casing, the gas under pressure functions as a spring to retain a substantial packed-off force on the packing elements and thereby insure against leakage of the well packer.

The parts are now in the position illustrated in FIGS. 2a to 2d. Pressure from above the well packer can enter the chamber 44 between the lower abutment 31 and the annular piston 46 by passing through the ports 36 in the upper abutment into the annular passage 35 and around the lower end of the sleeve 26 into the chamber. Thus, this chamber 44 will always have fluid under pressure in it corresponding to the fluid pressure above the packer externally of the tubing string C. On the other hand, pressure in the well casing below the set packer can pass into the chamber 55 between the annular piston 46 and the connector head 54, such fluid under pressure passing upwardly through the annular space 72 between the connector sleeve 53 and body 10 into such chamber.

The parts are so proportioned and arranged that pressure from below the tool tends to force the expander 56 downwardly to hold it wedged within its companion slips 90. Pressure from above the tool is also exerting a force to hold the expander in wedging relation within the slips to retain them anchored in the wall of the well casing. As disclosed in FIGS. 2a to 2d, a predominance of a pressure differential above the well packer acts downwardly on the packing structure 27, such force being transmitted through the lower abutment 31 and cylinder structure 51 directly to the expander 56, because of the abutting of the end 52a of the lower cylinder sleeve with the expander shoulder 56a. Thus, the pressure from above assists in holding the slips 90 anchored against the well casing and in retaining the packing elements 23, 24, 25 compressed in sealing relation against the wall of the well casing D.

Following anchoring in packed-off condition of the well packer in the casing, if a pressure differential is present below the well packer A, such pressure can pass through the passage 72 between the connector sleeve and body into the chamber 55 above the connector head 54. The pressure is acting upwardly on the annular piston 46 which engages the stop ring 48 connected to the body 10. However, the body cannot move upwardly because of the locking relation between the left-hand buttress threads 120 and the upper clutch segments 118, such upward force being transmitted through the housing 95 to the slips 90, which are wedged outwardly by the expander 56. The pressure in the chamber 55 is also acting in a downward direction over the cross-sectional area of the connector head 54, and the predominant fluid pressure below the tool is also being exerted against the lowermost packing element 25 which has an internal pressure equal to the predominant fluid pressure, such internal pressure being exerted in a downward direction over the abutment 31 and its gage ring 32. The lower annular area R of the lower abutment 31 is subject to the lesser fluid pressure that might exist above the packing structure 22, since such fluid pressure enters the chamber 44 above the annular piston 46 through the ports 36 and the annular passage 72. Because of the air in the atmospheric chamber 74 between the connector head 54 and the cylinder head 50, and the various elements on which the lower pressure is acting, it can be demonstrated that there is a resultant area R over which the pressure from below the well tool is acting in a downward direction on the expander 56, which area is quite substantial. Thus, the fluid pressure from below the apparatus is urging the reverse cone or expander 56 downwardly to retain it in wedged relation behind the slips 90, holding their teeth 130 anchored against the wall of the well casing.

It is, therefore, apparent that despite the presence of only a single set of slips 90 and a single companion expander 56, the well packer apparatus A will remain anchored in packed-off condition whether the pressure is exerted on the apparatus from below its packing structure 22 or above its packing structure. The left-hand thread and upper segment clutch mechanism 120, 119, 118 will hold and lock in the packer parts in the positions illustrated in FIGS. 2a to 2d, relative upward movement of the body 10, which is necessary to retraction of the well packer parts from the well casing, being prevented. As a result, even if no down weight is imposed on the apparatus A through the tubular string C, or for that matter, if there is no upward force on the apparatus, it will remain anchored in packed-off condition.

When the well packer is to be released from the well casing, the pressure above and below the said packer is equalized, as in the manner described hereinbelow. The tubular string C and the body 10 are then rotated several turns to the right while the tubing string and ɔdy move upwardly, the packer body 10 threading upardly with respect to the upper segmental nut or ıtch elements 118. Despite the fact that the left-hand reads 120 are disposed within the right-hand readed lower clutch elements 111, the latter cannot esh therewith and are merely held in the outward poion disclosed in FIG. 2d. The upward threading of e body 10 elevates the lower portion 42 of the upper ction 13 from the bearing member 37, which will reove the downward setting force on the upper abutent 27, the packing elements 23, 24, 25 retracting inrently from the well casing and shifting the abutment ' upwardly. Even if such shifting does not occur, the ɔp ring 48 secured to the body will engage the lower .d of the packing structure sleeve 26 to shift it and the ıper abutment upwardly relative to the lower abutent 31, this upward movement continuing until the eve flange 33 engages the lower end of the lower ıutment 31, which will then effect an elevation of the ıper cylinder sleeve 45 and of the cylinder 51 therelow with respect to the connector sleeve 53, until the linder head 50 engages the connector head 54. Conıued upward movement of the body 10 will move the ınnector sleeve and expander 56 upwardly, the exınder shifting in an upward direction with respect to e slips 90 whose upward movement is resisted and evented by the frictional engagement of the drag ocks 98 against the well casing. Because of the ngue and groove interconnection 91, 92 between the pander and the slips, the latter, as a result of moving latively downwardly of the expander, are shifted radily inwardly to their retracted position.

Upon complete upward unthreading of the left-hand ɔdy threads 120 from the upper clutch segments 118, e body 10 is free to be shifted upwardly without rotaɔn, the right-hand buttress threads 113 then ratchetg upwardly through the lower segmented nut 111 and locking the packer in its extended condition, as disosed in FIGS. 1a to 1d. The packer apparatus A is ɔw in its retracted position and can be shifted either ɔwnwardly or upwardly in the well casing to a new setıg location, or the packer can be elevated and reoved completely from the well casing, if desired.

When the apparatus is to be dismantled, the bleeder ug 77 is opened to vent the gas from the chamber 59, ereby preventing sudden expansion of the gas and ɔssible injury to persons and property.

Figure 5:
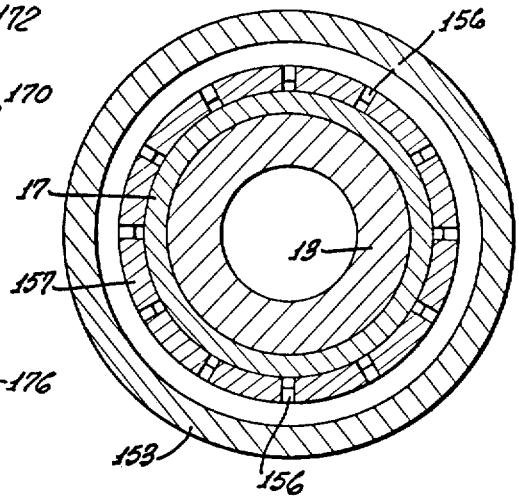
FIG. 5 is a cross-section on an enlarged scale take along the line 5—5 on FIG. 1b.
Figure 6:
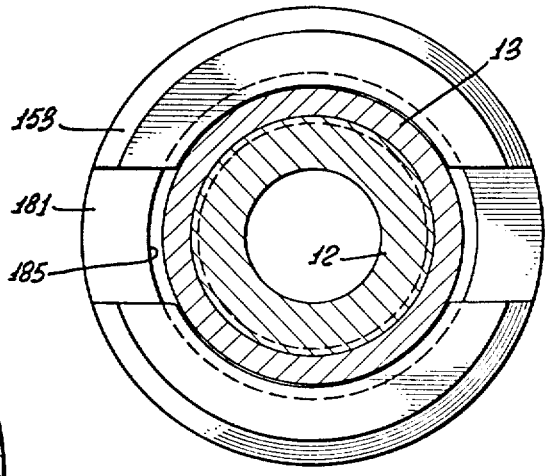
FIG. 6 is a cross-section on an enlarged scale take along the line 6—6 on FIG. 1b.
Figure 7:
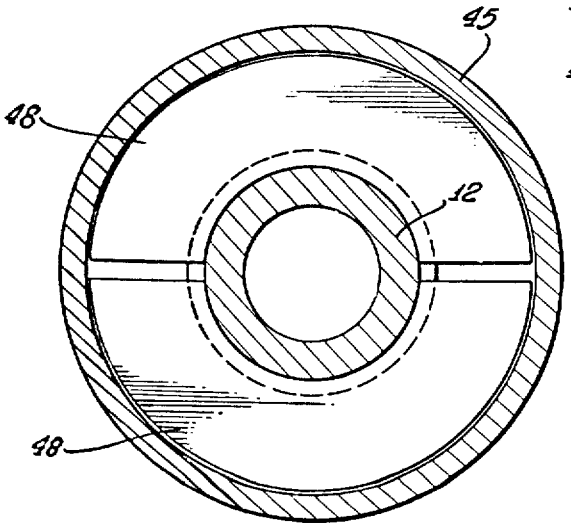
FIG. 7 is a cross-section on an enlarged scale take along the line 7—7 on FIG. 1c.

As disclosed in the drawing, the apparatus A is conituted as a retrievable bridge plug. It can be lowered the well casing and can be removed therefrom by eans of a running-in and retrieving tool B, which can so control the opened and closed position of the eeve valve 17 relative to the body ports 14, which will etermine whether or not the passage 11 through the ɔdy is in open or closed condition. As shown, the reieving tool includes a housing 150 adapted to teleope over the control head 16 and upper body section 3 of the well packer or bridge plug, as well as over its eeve valve 17. This housing consists of an upper body ɔrtion 151 threadedly secured to an upper body sub 52 which is threadedly connected to the lower end of ıe tubing string C that extends to the top of the well ɔre. The lower end of the upper housing section 151 threadedly secured to the upper end of a lower hausıg section 153 which carries a latch sleeve 154 that as the purpose of shifting the valve sleeve 17 between pen and closed positions. This latch sleeve includes an pper circumferentially continuous portion 155 and circumferentially spaced slots 156 (FIG. 5) that provide flexible spring-like arms 157 depending therefrom, the intermediate portions of the latch arms having inwardly directed latch fingers 158. These latch fingers have lower tapered surfaces 159 adapted to engage a companion upper tapered surface 160 on the valve sleeve 17 and to be deflected outwardly thereof so that the fingers are then disposed below an upper external flange 161 of the valve sleeve. The upper surfaces 162 of the fingers are also tapered for engagement with a companion tapered surface 163 at the lower end of the sleeve flange 161.

Figure 3A:
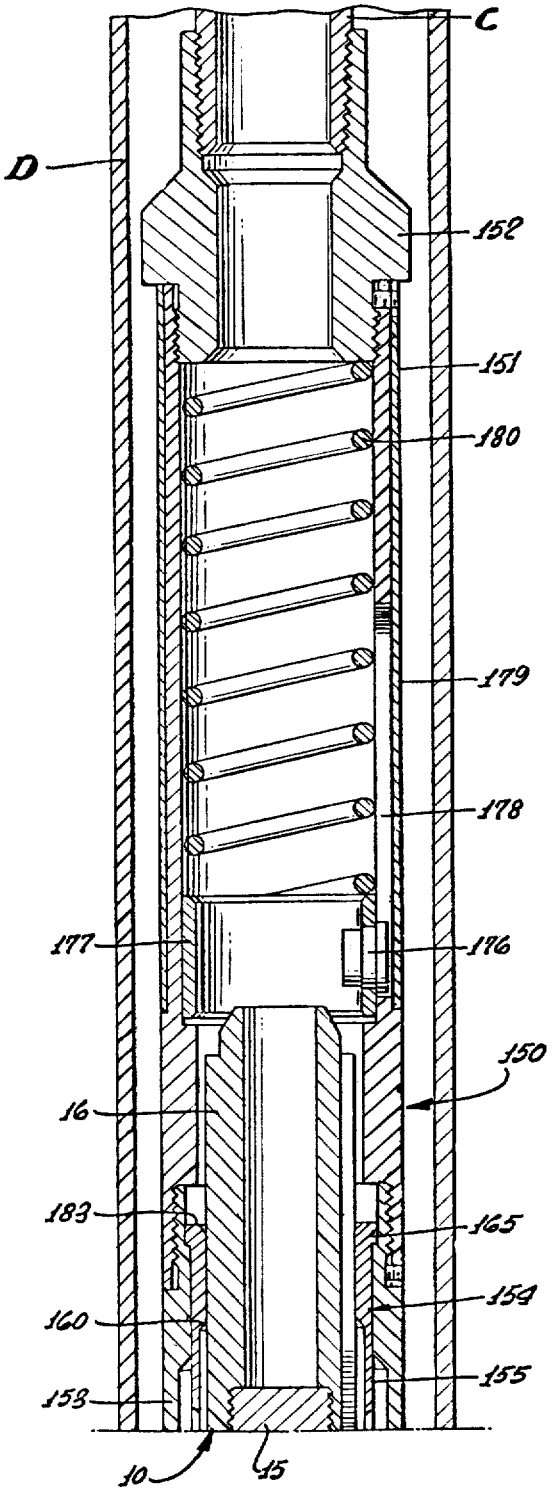
Figure 3B:
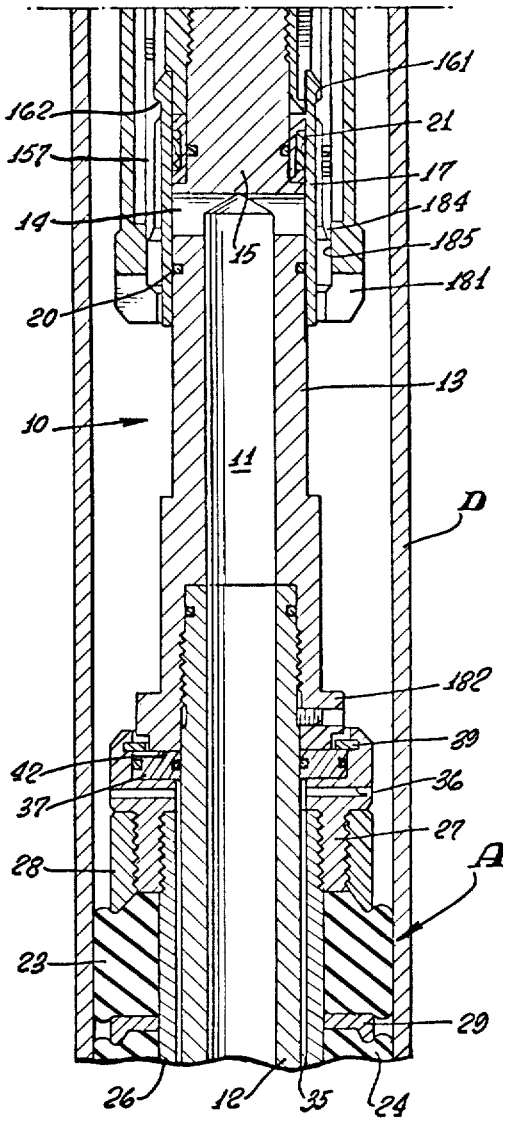

The latch sleeve 154 is adapted to occupy an upper position relative to the housing 150 in which it engages a housing shoulder 183, and in which the lower ends 184 of the latch arms are located above a restricted retaining bore 185 in the lower portion of the housing. At this time, the latch arms 157 can flex outwardly relatively freely within the housing so that the latch fingers 158 will readily snap over the flange 161 of the valve sleeve 17. However, when the latch sleeve 154 occupies a lower position relative to the housing 150, as determined by engagement of a latch sleeve flange 165 with an upwardly facing shoulder 166 in the housing, the lower ends 184 of the latch arms are confined within the restricted bore 185 of the lower housing portion 153, thereby preventing the lower ends 184 of the latch arms from deflecting outwardly and requiring a greater deflecting force to shift the latch fingers 158 laterally outwardly (FIG. 3b).

Figure 4:
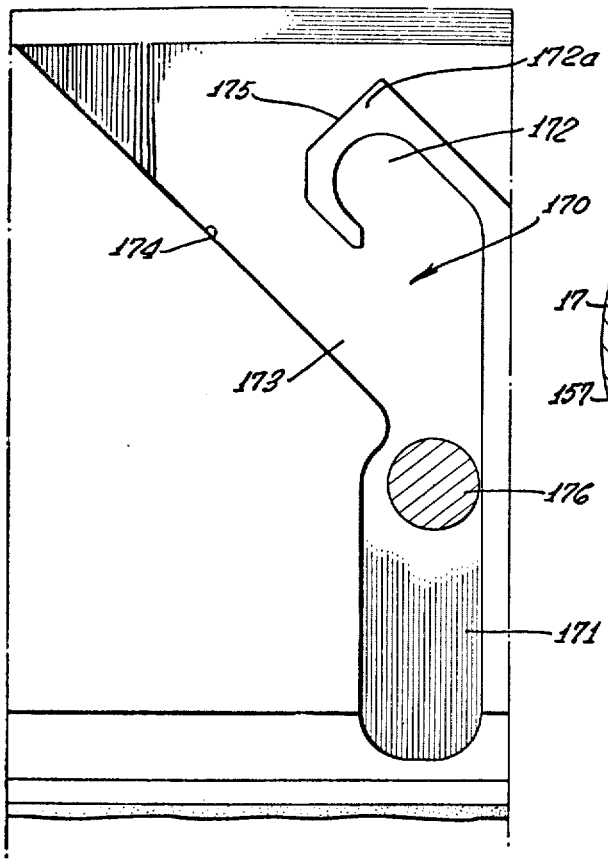
FIG. 4 is a diagrammatic view of the lock pin and sl arrangement for releasably securing the running-in an retrieving tool to the well packer or bridge plug.

The ability of the housing 150 to move longitudinally with respect to the control head 16, upper mandrel or body section 13, and sleeve valve 17 is governed by a control lock device between the housing and the control head. Thus, the control head 16 has one or more control slots 170 therein (see FIG. 4 specifically), each slot including a lower vertical leg portion 171 that terminates in an upper hook or pocket portion 172 closed by an end wall 172a. Below and adjacent to the hook portion the slot portion 171 communicates with an inclined entry and withdrawal slot portion 173 defined by an inclined surface 174 extending through the upper portion of the control head. An opposed surface 175 above the hook portion 172a on the sleeve converges in a downward direction relative to the inclined surface 174 of the slot.

The housing carries a radial lock pin 176 for each slot 170, the inner portion of which is received within the control slot 170. This lock pin is mounted in a ring or sleeve 177 and also extends into a longitudinal slot 178 in the upper body portion 151, the pin being retained in its inward position by a retainer sleeve 179 encompassing the upper body portion enclosing its slot. A helical compression spring 180 is mounted in the housing, its upper end engaging the body sub 152 and its lower end engaging the lock pin sleeve 177 so as to yieldably urge the lock pin 176 in a downward direction.

In lowering the packer or bridge plug apparatus A in the well casing, the running-in and retrieving tool B is disposed in the position illustrated in FIG. 1a, in which the valve sleeve 17 is in its lower port opening position, the lock pin being disposed in the longitudinal leg 171 of the slot below the hook portion 172, the lower end 181 of the housing engaging a shoulder 182 on the upper body section 13 so as to push the body or mandrel 10 of the tool in a downward direction and, through the right-hand body and clutch segment portions 113, 111 of the apparatus, pull the parts of the apparatus surrounding the body 10 in a downward direction. The fluid in the well casing can by-pass around the well packer apparatus A and can also flow upwardly through the central passage 11, out through the ports 1' and up through the housing 150 into the tubing string C.

When the setting location in the well casing D is reached, the tubing string C is rotated to the right, such right-hand rotation being transmitted through the housing 150 to the lock pin 176, and from the latter to the control head 16, the pin engaging a side wall of the longitudinal slot 171. The control head 16, being secured to the body 10 of the tool, transmits its rotation to the latter so that its right-hand threads 113 unscrew in a downward direction from the lower clutch segments 111, whereupon an appropriate downward force can be imposed by the tubular string C on the housing 150 and on the body 10 to effect full setting of the well packer, in the manner described above, the parts being located in the positions illustrated in FIGS. 2a to 2d, inclusive.

The running-in and retrieving tool B can now be released from the well packer or bridge plug A, the latter remaining in its anchored and packed-off condition in the well casing D. The tubing string C is elevated, and during such elevation is turned to the right so that the lock pin 176 shifts from the longitudinal slot 171 into the diagonal slot 173, allowing the lock pin to move upwardly out of the control head slot 170. Immediately following such upward movement, the fingers 158 of the latch sleeve 154 engage the flange 161 on the valve sleeve 171, whereupon the housing 150 will move upwardly relative to the latch sleeve to dispose the lower ends 184 of the latch arms within the restricted bore 185 of the housing to increase the resistance to outward deflection of the latch arms. Upward movement of the tubing string and running-in and retrieving tool will now cause the fingers 158 to shift the valve sleeve 17 upwardly to the extent limited by its engagement with the downwardly facing shoulder 19 on the control head, at which time the sleeve has closed the ports 14, as disclosed in FIGS. 3a and 3b. Continued upward movement of the tubing string C and an increase of the upward force will then cause the fingers 158 to be cammed outwardly from engagement with the valve sleeve flange 161 because of the coengagement of their tapered surfaces 162, 163, freeing the latch sleeve 154 from the valve sleeve 17 and allowing the tubing string C and the retrieving device B to be elevated in the casing string D to a desired extent, or removed entirely therefrom at the top of the hole. The passage 11 through the well packer is now closed so that it functions as a bridge plug. As stated above, the bridge plug A will remain in anchored and packed-off condition, despite the imposition of fluid pressure upon it from above or below.

In the event it is desired to release and retrieve the bridge plug or well packer A from the well casing, the running-in and retrieving head B is lowered in the casing D, the housing 150 moving over the control head 16, and the lock pin 176 being directed by the converging tapered surfaces 174, 175 on the control head into the diagonal slot 173, shifting from the diagonal slot into the longitudinal slot 171. The fingers 158 will engage the upper end 160 of the valve sleeve flange 161, and the housing will shift downwardly so that the lower ends 184 of the latch arms 157 are disposed out of the restricted housing bore 185. Accordingly, a much lesser force is required to deflect the arms and their fingers outwardly, such fingers riding past the flange 161 to a position therebelow retracting inwardly. The latch sleeve 154 and housing 150 continue moving downwardly until a shoulder 190 on the latch sleeve engages the tapered surface 160 at the upper end of the valve sleeve 17, to shift the latter downwardly to its por opening position illustrated in FIG. 1a, the downwarc force being transmitted from the housing 150 to the upper end of the latch sleeve flange 165 and from the latch sleeve to the valve sleeve 17. The downward shifting of the valve sleeve is limited by engagement of the lower end 181 of the housing with the shoulder 182 or the upper mandrel or body section 13. At this time, the lock pin 176 is disposed in the longitudinal leg 171 o the control head slot.

The opening of the ports 14 allows the pressure above and below the well packer or bridge plug A to equalize whereupon the tubing string C and housing 150 are rotated to the right, the rotation being transmitted through the lock pin 176 and control head 16 to the body 10 of the tool, to thread the left-hand buttres threads 120 upwardly within the upper thread 119 o clutch segments 118 until the slips 90 and packing structure 22 have been returned to their initial position and the right-hand body threads 113 are again relocke in the lower segments 111, as described hereinabove The bridge plug A can now be either shifted downwardly to a new location in the well casing, or shifte upwardly in the well casing to a new location, or, if desired, removed entirely from the latter. Upward movement of the tubing string C will move the retrieving too housing 150 upwardly, the lock pin 176 moving int the hook portion 172 of the slot 170 at the upper en of its longitudinal portion. Such upward movement wil move the latch sleeve 154 upwardly with the oute housing 150, but the pin will be disposed in the hool portion 172, 172a of the slot 170 before the fingers 15 can engage the valve sleeve flange 161. Upward movement of the tubing string C will now carry the packe body 10 and the entire apparatus upwardly with it, th body ports 14 remaining in their open condition to facilitate elevation of the apparatus A through the fluid i the well casing D, the fluid, of course, also relativel by-passing around the exterior of the retracted bridg plug parts. As stated above, the apparatus can be re moved from the well casing and the compressed ga bled from the pressure chamber 59.

It is, accordingly, apparent that a retrievable too such as a well packer or bridge plug, has been provide which is capable of holding pressure in both direction without the assistance of the tubular string or othe force applying means. It is unnecessary for any parts t shift relative to one another in the event that the pressure differential acting on the well packer shifts from position above the well packer to a position therebe low, or vice versa. The parts remain locked in thei holding and sealed and packed-off condition becaus of the ratchet locks afforded by the left-hand thread 120 in the upper segments 118. That is to say, th upper clutch mechanism mechanically holds the tool i its set condition. Inasmuch as only a reverse cone or expander 56 is used, the tool is easy to retrieve, since th upper movement of the expander tends to retract th slips 90. This is to be distinguished from other tools th employ both upward and downward slips and compar ion expanders, in which the upwardly holding slips an expanders might tend to resist release from the we casing, and may inadvertently effect setting of the u ırdly holding slips during the elevation of the well ɔl in the well casing.

The compressed gas chamber 59 functions as a spring retain the setting or packing force on the tool, de- ite loss of packing material due to extrusion, and the e. However, this feature, although capable of effec- ely insuring the retention of the packer apparatus in aled-off and set condition, need not be used, in which ent the lower abutment 31 would be secured directly the expander 56, as through the use of a suitable in- ·vening sleeve.

I claim:

1. In a well tool adapted to be set in a well bore: a ıdy structure; normally retracted means on said body ·ucture; means responsive to movement of said body ·ucture in one direction relative to said normally re- ıcted means for expanding said normally retracted ɜans outwardly, said expanding means including amber means containing a gas under pressure exert- g a constant force tending to retain said normally re- ıcted means in expanded condition; first releasable ıtch means acting between said body structure and ırmally retracted means for preventing such move- ent of said body structure relative to said normally tracted means; and second releasable clutch means ting between said body structure and normally re- acted means for preventing movement of said body ructure relative so said normally retracted means in e opposite direction to lock said normally retracted eans in its outwardly expanded condition.

2. In a well tool adapted to be set in a well bore: a ɔdy structure; normally retracted means on said body ructure; means for expanding said normally retracted eans outwardly and including chamber means con- ining a gas under pressure exerting a constant force nding to retain said normally retracted means in ex- ınded condition; first releasable clutch means acting ɜtween said body structure and normally retracted eans for preventing said normally retracted means om being expanded outwardly; and second releasable utch means acting between said body structure and ɔrmally retracted means for locking said normally re- acted means in its outwardly expanded condition.

3. In a well tool adapted to be set in a well bore: a ɔdy structure; normally retracted means on said body ructure; means responsive to longitudinal movement f said body structure in one direction relative to said ɔrmally retracted means for expanding said normally ·tracted means outwardly, said expanding means in- uding chamber means containing a gas under pres- ıre exerting a constant force tending to retain said ɔrmally retracted means in expanded condition; first ·leasable clutch means acting between said body ructure and normally retracted means for preventing ıch longitudinal movement of said body structure rel- tive to said normally retracted means; and second re- ·asable clutch means acting between said body struc- ıre and normally retracted means for preventing lon- itudinal movement of said body structure relative to aid normally retracted means in the opposite direction ɔ lock said normally retracted means in its outwardly xpanded condition.

4. In a well tool adapted to be set in a well bore: a ody structure; normally retracted means on said body ·ructure; means for expanding said normally retracted ıeans outwardly and including chamber means con- ıining a gas under pressure exerting a constant force ·nding to retain said normally retracted means in ex- panded condition; a clutch member slidably relatively longitudinally on said body structure and operatively connected to said normally retracted means; a first clutch element movable laterally on said clutch member into clutching engagement with said body structure for preventing said normally retracted means from being expanded outwardly; and a second clutch element movable laterally on said clutch member into clutching engagement with said body structure for locking said normally retracted means in its outward expanded condition.

5. In a well tool adapted to be set in a well bore: a body structure; normally retracted means on said body structure; means responsive to longitudinal movement of said body structure in one direction relative to said normally retracted means for expanding said normally retracted means outwardly, said expanding means including chamber means containing a gas under pressure exerting a constant force tending to retain said normally retracted means in expanded condition; a clutch member slidable relatively longitudinally on said body structure and operatively connected to said normally retracted means; a first clutch element movable laterally on said clutch member into clutching engagement with said body structure for preventing such longitudinal movement of such body structure relative to said normally retracted means; and a second clutch element movable laterally on said clutch member into clutching engagement with said body structure for preventing longitudinal movement of said body structure relative to said normally retracted means in the opposite direction to lock said normally retracted means in its outwardly expanded condition.

6. In a well tool adapted to be set in a well bore: a body structure; normally retracted means on said body structure; means for expanding said normally retracted means outwardly and including chamber means containing a gas under pressure exerting a constant force tending to retain said normally retracted means in expanded condition; said body structure having first and second threaded portions; a clutch member slidable relatively longitudinally along said threaded portions and operatively connected to said normally retracted means; a first threaded clutch element movable laterally on said clutch member and being meshable with said first threaded portion for preventing said normally retracted means from being expanded outwardly; a second threaded clutch element movable laterally on said clutch member into threaded mesh with said second portion for locking said normally retracted means in its outwardly expanded condition; the threads of said first portion and first element being of opposite hand from the threads of said second portion and second element.

7. In a well tool adapted to be set in a well bore: a body structure; normally retracted means on said body structure; means responsive to longitudinal movement of said body structure in one direction relative to said normally retracted means for expanding said normally retracted means outwardly, said expanding means including chamber means containing a gas under pressure exerting a constant force tending to retain said normally retracted means in expanded condition; said body structure having first and second threaded portions; a clutch member slidable relatively longitudinally along said threaded portions and operatively connected to said normally retracted means; a first threaded clutch element movable laterally on said clutch member and being meshable with said first threaded portion for preventing such longitudinal movement of said body structure relative to said normally retracted means; a second threaded clutch element movable laterally on said clutch member into threaded mesh with said second portion for preventing longitudinal movement of said body structure relative to said normally retracted means in the opposite direction to lock said normally retracted means in its outwardly expanded condition; the threads of said first portion and first element being of opposite hand from the threads of said second portion and second element.

8. In a well tool adapted to be set in a well bore: a body structure; normally retracted means on said body structure; means for expanding said normally retracted means outwardly and including chamber means containing a gas under pressure exerting a constant force tending to retain said normally retracted means in expanded condition; said body structure having first and second buttress thread portions of opposite hand; a clutch member slidable longitudinally along said threaded portions and operatively connected to said normally retracted means; a first clutch element movable laterally on said clutch member and having a buttress thread meshing with the first threaded portion to prevent said normally retracted means from being expanded outwardly; and a second clutch element movable laterally on said clutch member and having a buttress thread adapted to mesh with said second threaded portion to lock said normally retracted means in its outwardly expanded condition.

9. In a well tool adapted to be set in a well bore: a body structure; normally retracted means on said body structure; means responsive to longitudinal movement of said body structure in one direction relative to said normally retracted means for expanding said normally retracted means outwardly, said expanding means including chamber means containing a gas under pressure exerting a constant force tending to retain said normally retracted means in expanded condition; said body structure having first and second buttress thread portions of opposite hand; a clutch member slidable longitudinally along said threaded portions and operatively connected to said normally retracted means; a first clutch element movable laterally on said clutch member and having a buttress thread meshing with said first threaded portion for preventing such longitudinal movement of said body structure relative to said normally retracted means; and a second clutch element movable laterally on said clutch member and having a buttress thread adapted to mesh with said second threaded portion to prevent longitudinal movement of said body structure relative to said normally retracted means in the opposite direction to lock said normally retracted means in its outwardly expanded condition.

10. In a well tool adapted to be set in a well bore: a body structure; normally retracted means on said body structure; means responsive to downward movement of said body structure relative to said normally retracted means for expanding said normally retracted means outwardly, said expanding means including chamber means containing a gas under pressure exerting a constant force tending to retain said normally retracted means in expanded condition; first releasable means acting between said body structure and normally retracted means for preventing such downward movement of said body structure relative to said normally retracted means; and second releasable clutch means acting between said body structure and normally retracted means for preventing upward movement of said body structure relative to said normally retracted means to lock said normally retracted means in its outwardly expanded condition.

11. In a well tool adapted to be set in a well bore: a body structure; normally retracted means on said body structure; means responsive to downward movement of said body structure relative to said normally retracted means for expanding said normally retracted means outwardly, said expanding means including chamber means containing a gas under pressure exerting a constant force tending to retain said normally retracted means in expanded condition; said body structure having first and second threaded portions; a clutch member slidable longitudinally along said threaded portions and operatively connected to said normally retracted means; a first threaded clutch element movable laterally on said clutch member and being meshable with said first threaded portion for preventing downward movement of said body structure relative to said normally retracted means; a second threaded clutch element movable laterally on said clutch member into threaded mesh with said second portion for preventing upward movement of said body structure relative to said normally retracted means to lock said normally retracted means in its outwardly expanded condition; the threads of said first portion and first element being of opposite hand from the threads of said second portion and second element.

12. In a well tool adapted to be set in a well bore: a body structure; normally retracted means on said body structure; means responsive to downward movement of said body structure relative to said normally retracted means for expanding said normally retracted means outwardly, said expanding means including chamber means containing a gas under pressure exerting a constant force tending to retain said normally retracted means in expanded condition; said body structure having first and second buttress thread portions of opposite hand; a clutch member slidable along said threaded portions and operatively connected to said normally retracted means; a first clutch element movable laterally on said clutch member and having a buttress thread meshing with said first threaded portion to prevent downward movement of said body structure relative to said normally retracted means; and a second clutch element movable laterally on said clutch member and having a buttress thread adapted to mesh with said second threaded portion to prevent upward movement of said body structure relative to said normally retracted means to lock said normally retracted means in its outwardly expanded condition.

13. In a well tool adapted to be set in a well bore: a body; normally retracted packing means on said body; normally retracted slip means on said body; means responsive to longitudinal movement of said body in one direction for expanding said packing means and slip means laterally outwardly, said expanding means including chamber means containing a gas under pressure exerting a constant force tending to retain said packing means and slip means in expanded condition; first releasable clutch means acting between said body and slip means for preventing said body from effecting expansion of said slip means and packing means; and second releasable clutch means acting between said body and slip means for locking said slip means and packing means in their outwardly expanded condition.

14. In a well tool adapted to be set in a well bore: a body; normally retracted packing means on said body; normally retracted slip means on said body; means responsive to downward movement of said body for expanding said packing means and slip means laterally outwardly, said expanding means including chamber means containing a gas under pressure exerting a constant force tending to retain said packing means and slip means in expanded condition; first releasable clutch means acting between said body means and slip means to prevent said body from effecting expansion of said slip means and packing means; and second releasable clutch means acting between said body and slip means for locking said slip means and packing means in their outwardly expanded condition.

15. In a well tool adapted to be set in a well bore: a body; normally retracted packing means on said body; normally retracted slip means on said body; means responsive to downward movement of said body for expanding said packing means and slip means laterally outwardly, said expanding means including chamber means containing a gas under pressure exerting a constant force tending to retain said packing means and slip means in expanded condition; said body having first and second threaded portions; a clutch member slidable relatively longitudinally along said threaded portions and operatively connected to said slip means; a first threaded clutch element movable laterally on said clutch member and being meshable with said first threaded portion for preventing said packing means and slip means from being expanded outwardly; a second threaded clutch element movable laterally on said clutch member into threaded mesh with said second portion for preventing upward movement of said body relative to said slip means to lock said slip means and packing means in their outward expanded condition; the threads of said first portion and first element being of opposite hand from the threads of said second portion and second element.

16. In a well tool adapted to be set in a well bore: a body; normally retracted packing means on said body; normally retracted slip means on said body; means responsive to downward movement of said body for expanding said packing means and slip means laterally outwardly, said expanding means including chamber means containing a gas under pressure exerting a constant force tending to retain said packing means and slip means in expanded condition; said body having first and second buttress thread portions of opposite hand; a clutch member slidable longitudinally along said threaded portions and operatively connected to said slip means; a first clutch element movable laterally on said clutch member and having a buttress thread meshing with said first threaded portion to prevent downward movement of said body relative to said slip means and packing means to prevent said slip means and packing means from being expanded outwardly; and a second clutch element movable laterally on said clutch member and having a buttress thread adapted to mesh with said second threaded portion to prevent upward movement of said body relative to said slip means and packing means to lock said slip means and packing means in their outwardly expanded condition.

17. In a well tool adapted to be set in a well bore: a body; normally retracted packing means on said body; means for expanding said packing means laterally outwardly, comprising abutment means for exerting an expanding force on said packing means; and chamber means surrounding said body and containing a gas under pressure charged into said chamber means at the top of the well bore for exerting a continuous spring-like force on said abutment means to hold said packing means expanded outwardly.

18. In a well tool adapted to be set in a well bore: a body; normally retracted packing means on said body; an upper abutment engaging said packing means; a lower abutment engaging said packing means; means for relatively shifting said abutments toward each other to expand said packing means laterally outwardly; chamber means surrounding said body and operatively connected to one of said abutments; said chamber means containing a gas under pressure charged into said chamber means at the top of the well bore for exerting a continuous spring-like force on said chamber means and said one abutment to urge said one abutment toward the other abutment.

19. In a well tool adapted to be set in a well bore: a body; normally retracted slip means disposed around said body; expander means around said body above and engaging said slip means; means for relatively moving said expander means downwardly of said slip means to expand said slip means relatively outwardly; packing means above said expander means adapted to seal against the wall of the well bore; means providing a downwardly facing transverse surface on said expander means subject to the pressure of fluid in the well bore above said packing means; and means providing a resultant upwardly facing transverse surface on said expander means subject to the pressure of fluid in the well bore below said packing means, whereby a greater well bore pressure below said packing means and above said packing means forces said expander means downwardly within said slip means to retain said slip means expanded outwardly.

20. In a well tool adapted to be set in a well bore: a body structure; normally retracted packing means on said body structure; means responsive to movement of said body structure in one direction relative to said normally retracted packing means for expanding said normally retracted packing means outwardly, said expanding means including spring-like means exerting a constant force tending to retain said normally retracted packing means in expanded condition; first releasable clutch means acting between said body structure and normally retracted packing means for preventing such movement of said body structure relative to said normally retracted packing means; and second releasable clutch means acting between said body structure and normally retracted packing means for preventing movement of said body structure relative to said normally retracted packing means in the opposite direction to lock said normally retracted packing means in its expanded condition.

21. In a well tool adapted to be set in a well bore: a body structure; normally retracted packing means on said body structure; means for expanding said normally retracted packing means outwardly and including spring-like means exerting a constant force tending to retain said normally retracted packing means in expanded condition; first releasable clutch means acting between said body structure and normally retracted packing means for preventing said normally retracted packing means from being expanded outwardly; and second releasable clutch means acting between said body structure and normally retracted packing means for locking said normally retracted packing means in its outwardly expanded condition.

22. In a well tool adapted to be set in a well bore: a body; normally retracted means on said body; means for expanding said normally retracted means laterallly outwardly, comprising abutment means for exerting an expanding force on said normally retracted means; and chamber means surrounding said body and containing a gas under pressure charged into said chamber means at the top of the well bore for exerting a continuous spring-like force on said abutment means to hold said normally retracted means expanded outwardly.

23. In a well tool adapted to be set in a well bore: a body; normally retracted means on said body; an upper abutment engaging said normally retracted means; a lower abutment engaging said normally retracted means; means for relatively shifting said abutments toward each other to expand said normally retracted means laterally outwardly; chamber means surrounding said body and operatively connected to one of said abutments; said chamber means containing a gas under pressure charged into said chamber means at the top of the well bore for exerting a continuous spring-like force on said chamber means and said one abutment to urge said one abutment toward the other abutment.

*24. In a well tool adapted to be set in a well bore as defined in claim 19; said downwardly facing transverse surface being disposed below said packing means, passage means extending within said packing means for conducting said pressure of the fluid in the well bore from above said packing means to said downwardly facing transverse surface; said upwardly facing transverse surface being adjacent to the lower end of said packing means; said upwardly facing transverse surface being greater in area than said downwardly facing transverse surface.*

*25. In a well tool adapted to be set in a well bore: a body; normally retracted slip means disposed around said body; expander means around said body above and engaging said slip means; packing means above and engageable with said expander means and adapted to seal against the wall of the well bore; upper abutment means engaging the upper portion of said packing means; said expander means including lower abutment means engaging the lower portion of said packing means and having a cylinder portion extending downwardly of said lower abutment means, said lower abutment means having a portion extending laterally inwardly of the inner wall of said cylinder portion; means providing a first slidable seal between the inner wall of said cylinder portion and said body to prevent the pressure of fluid in the well bore below said packing from acting upwardly on said lower abutment means portion; means providing a second seal between said lower abutment means portion and said body; said first and second seals providing a resultant downwardly facing transverse surface on said lower abutment means of less area than an upwardly facing transverse surface on said lower abutment means; said upwardly facing surface being subject to the pressure of fluid in the well bore below said packing means to force said expander means downwardly within said slip means; means for conducting the pressure of fluid in the well bore above said packing means to said downwardly facing surface of said lower abutment means; and means including means acting through said upper abutment means packing means, and lower abutment means for relatively moving said expander means downwardly of said slip means to expand said slip means relatively outwardly.*

*26. In a well tool adapted to be set in a well bore as defined in claim 25; said packing means being initially retracted and being expanded laterally outwardly into sealing engagement with the wall of the well bore upon downward movement of said expander means within said slip means.*

*27. In a well tool adapted to be set in a well bore: a body; normally retracted slip means disposed around said body; expander means around said body above and engaging said slip means; normally retracted packing means above and engageable with said expander means and adapted to be expanded into sealing engagement against the wall of the well bore; an upper abutment engaging the upper portion of said packing means; a sleeve secured to said upper abutment and extending downwardly through said packing means and around said body; said expander means including a lower abutment surrounding said sleeve and engaging the lower portion of said packing means; said expander means also including a cylindrical portion laterally spaced from said sleeve and secured to and depending from said lower abutment; means providing a first slidable seal between the inner wall of said cylinder portion and said body to prevent pressure of fluid in the well bore below said packing from acting upwardly on said lower abutment; means providing a second seal between said lower abutment and said sleeve; said first and second seals providing a resultant downwardly facing transverse surface on said lower abutment of less area than an upwardly facing transverse surface on said lower abutment, said upwardly facing surface being subject to the pressure of fluid in the well bore below said packing means to force said expander means downwardly within said slip means; means for conducting the pressure of fluid in the well bore from above said packing means through the space between said sleeve and body to said downwardly facing surface of said lower abutment; and means including means acting through said upper abutment, packing means, and lower abutment for relatively moving said expander means downwardly of said slip means to expand said slip means relatively outwardly and to expand said normally retracted means outwardly into sealing engagement with the wall of the well bore.*

* * * * *